Patented Apr. 27, 1948

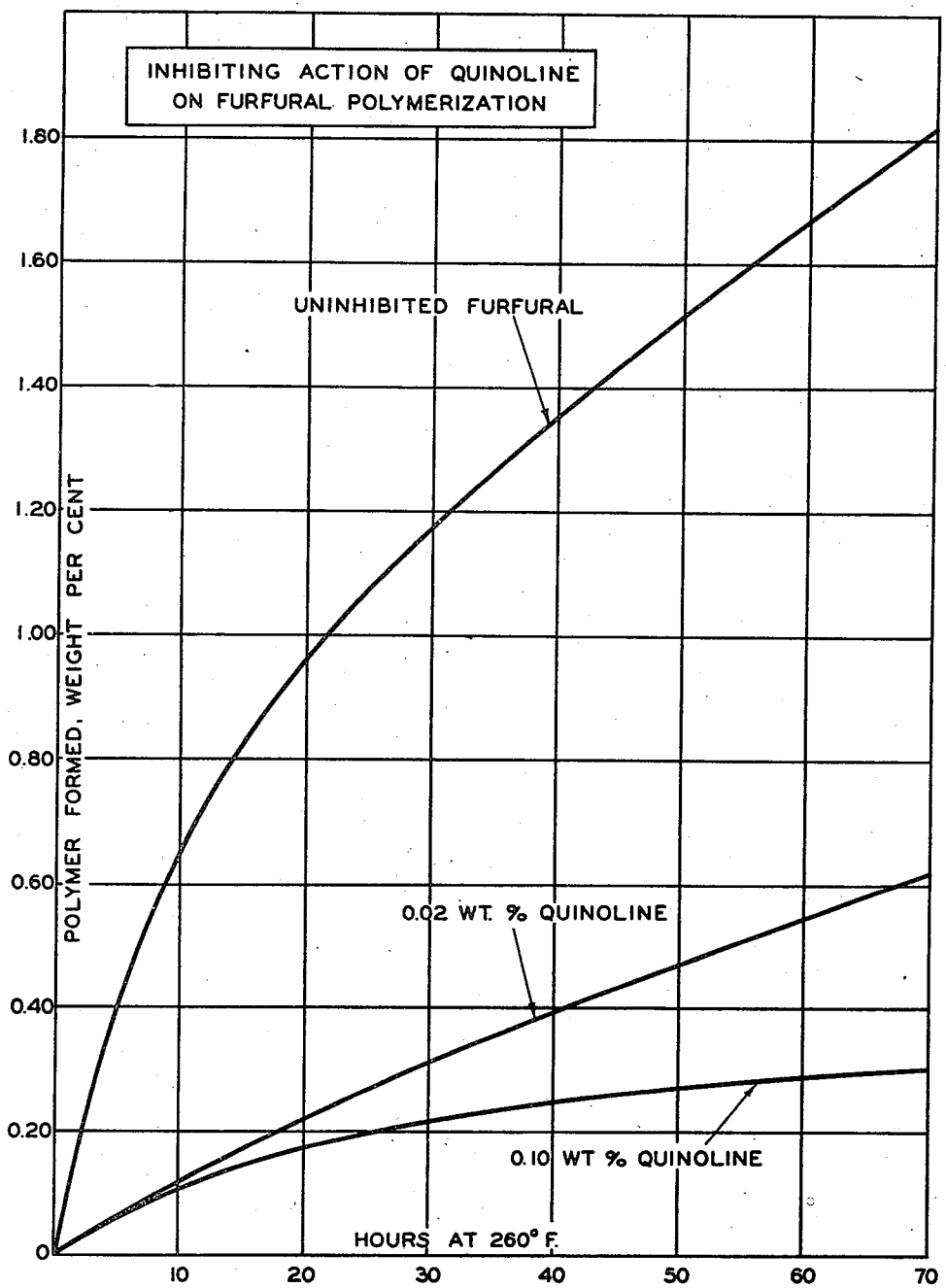

2,440,442

UNITED STATES PATENT OFFICE 2,440,442

INHIBITING POLYMERIZATION OF FURFURAL

John C. Hillyer, Bartlesville, Okla., and Daniel A. Nicewander, Borger, Tex., assignors to Phillips Petroleum Company, a corporation of Delaware Application March 26, 1945, Serial No. 584,984

14 Claims. (Cl. 260—347)

This invention relates to a method for inhibiting polymerization of furfural. More specifically, this invention relates to the addition of selected organic compounds to furfural to inhibit the formation of polymeric materials when said furfural is subjected to elevated temperature. Still more specifically this invention is concerned with the use of quinoline and its alkyl derivatives as agents for preventing or greatly retarding the formation of non-volatile materials such as aldehyde condensation products, tars, resins and the like in furfural used as a solvent in various commercial processes. The present invention is particularly concerned with the problem of inhibiting furfural polymerization in those processes wherein furfural is maintained at elevated temperatures over extended periods of time or under conditions conducive to the formation of resinous materials.

Furfural is employed in large quantities in numerous commercial processes. Its use as a selective solvent for the segregation of compounds or groups of compounds, whose volatilities lie so close together that other methods of separation are impractical or inadequate, is well known. In the refining of lubricating oils, for example, undesirable olefinic and diolefinic hydrocarbon constituents may be separated from the paraffinic and naphthenic hydrocarbons through the use of furfural. Similarly, in the refining of natural drying oils employed in paints, various dissimilar fractions which have characteristics superior to the original mixture may be obtained. Furfural has also come into extensive use in extractive distillation processes wherein the volatilities of close-boiling compounds are altered sufficiently to enable separations to be effected satisfactorily in commercial fractionators or super-fractionators. Thus, from C4 hydrocarbon fractions produced in refinery operations such as thermal or catalytic cracking, there may be obtained streams of substantially pure n-butenes, butadiene, and olefin-free normal and isobutane streams. The dehydrogenation of n-butane yields n-butenes which may be separated from the butane by furfural extractive distillation to yield a recycle stream substantially free from unsaturates. Similarly products resulting from the dehydrogenation of n-butenes may be segregated to give essentially complete recovery of 1,3-butadiene in the state of purity required for the manufacture of synthetic rubber and yield a stream of substantially diolefin-free butenes for recycling to the catalyst. Other applications of the selective action of furfural are numerous. Our invention is applicable to furfural used in these or any other applications where furfural polymerization is encountered.

In the various commercial processes utilizing the selective solvent action of furfural, elevated temperatures are maintained over an extended period as the solvent circulates throughout the system. While furfural is known to darken fairly rapidly when stored at atmospheric temperatures, with the resultant formation of tarry or resinous polymerization products, the formation of said polymeric materials is greatly accelerated as the temperature is increased. In commercial systems the temperature is often maintained at about 200–300° F. or higher thereby promoting the formation of tarry products which accumulate in vital parts of the equipment such as valves, pumps, heat exchanger tubes and the like and seriously interfere with flow and operation of the process. In extreme cases polymer formation may occur to such an extent as to block transfer lines. In addition to operational difficulties the selectivity of the solvent is markedly decreased and may render the desired separation unsatisfactory or even impossible.

In order to avoid the operating difficulties inherent in furfural-extraction systems and to maintain the solvent selectivity at a high level, it has heretofore been necessary to provide facilities for the removal of polymeric materials. Polymer removal has been accomplished by installing means for periodic distillation of the solvent or a continuous distillation system has been provided whereby a sufficient portion of the circulating stream is distilled at such a rate as to keep the polymer content below a certain level. Methods now in use for purifying furfural used in recovery of normal butene and butadiene from C4 hydrocarbon streams are described in the copending application of Hachmuth, Ser. No.

460,874, which issued April 3, 1945, as Patent No. 2,372,668, and in U. S. Patents to Buell et al., 2,350,584, and Hachmuth, 2,350,609. The methods hitherto proposed accomplish satisfactory elimination of the polymer but at the same time there is entailed an appreciable loss in the volume of solvent. The cost of replacing the solvent often becomes a major factor in the total operating cost and may be sufficient to render the process commercially unattractive. While certain operating difficulties may account for losses in the furfural, it has been found that the formation of heavy polymer is responsible for the major portion of the loss. Complete or partial elimination of polymer formation is highly desirable and the accomplishment of this objective would constitute a valuable advance in the art of furfural extraction processes.

Our invention is particularly applicable to furfural used as the solvent in the extractive distillation of aliphatic hydrocarbon streams to recover unsaturated hydrocarbons therefrom such as olefins and/or diolefins, for example, normal butene and/or butadiene from $C_4$ hydrocarbon streams, this being the principal if not the only present commercial application of extractive distillation with furfural as a means of recovering unsaturated hydrocarbons. However, our invention may be applied wherever furfural is used as the solvent in the recovery by extractive distillation of other aliphatic olefins or aliphatic conjugated diolefins from hydrocarbon streams containing the same.

In extractive distillation, solvent extraction is combined with continuous fractional distillation, the furfural being supplied continuously to the top of the column and descending therein and the hydrocarbon feed being supplied to an intermediate point in the column and being vaporized upwardly countercurrently to the furfural, there being provided the usual bubble trays or packing, a reboiler at the bottom of the column and means for condensing overhead vapors and returning condensate as reflux to the top of the column. The separation of butadiene in this manner is described in copending applications of Hachmuth, Ser. No. 454,312, filed August 10, 1942, which issued January 28, 1947, as Patent No. 2,415,006, and Ser. No. 438,844, filed Apr. 13, 1942, which issued January 20, 1948, as Patent No. 2,434,796. The latter application also discloses the separation of normal butene from normal butane and is directed to the use of a solvent consisting of furfural containing dissolved water in amount ranging from 1% up to saturation which substantially lowers the boiling temperature of the furfural. The temperature at the bottom of the extractive distillation column is the boiling point of the liquid at that point under the operating pressure of the column. The operating pressure is sufficiently high to permit condensation of a portion of the overhead vapors for reflux. The liquid in the bottom of the absorption column is composed of furfural having dissolved therein water and the selectively absorbed hydrocarbon. This bottoms liquid is withdrawn and introduced into another column at a point near the top. In this second column the dissolved unsaturated hydrocarbons are stripped out of the top and the lean furfural bottom liquid is cooled and returned to the absorption column. The stripper column is provided with a reboiler at its bottom and means for refluxing with condensed overhead. The temperature at the bottom of the stripping column is the boiling point of the liquid at that point under the column operating pressure. Ordinarily the furfural absorber and stripper are operated with bottom temperatures of 300-325° F. and under pressures of 50-65 pounds per square inch gauge. In the furfural re-run unit which operates continuously on a sidestream of the lean furfural, temperatures of 200-300° F. and pressures ranging from atmospheric to 40 pounds per square inch gauge are commonly maintained. Thus, it will be seen that the furfural is continuously being subjected to repeated vaporization at relatively high temperatures. The combined influence of heat, pressure, iron and iron salts, acids, moisture and hydrocarbon, especially olefins or diolefins, and other factors as yet but little understood brings about the polymerization of the furfural. Due to the scarcity and high cost of furfural in this manner has been a most serious problem. This problem is made more serious because the best available information to date indicates that the polymerization of furfural is autocatalytic.

It is an object of the present invention to provide a method of inhibiting the formation of high-boiling resins, tars and other non-volatile materials in furfural.

It is also an object of the invention to provide a means for reducing the accumulation of heavy tar deposits in furfural extractive distillation systems operated at elevated temperatures.

It is a further object to maintain the furfural in a high state of selectivity in extractive distillation systems while simultaneously preventing or reducing polymer formation in said systems.

It is a still further object to reduce the formation of polymeric materials in furfural through the addition of inhibitors selected from the group consisting of quinoline and its alkyl homologs.

The accompanying drawing portrays graphically the effect of quinoline as an inhibitor for polymerization of accelerated furfural as determined by laboratory studies.

Heretofore no practical process for reducing or retarding the rate of polymer formation in furfural has been advanced. The addition of small quantities of antioxidants, particularly pyrogallol, has been proposed but this expedient has not been found to give satisfactory results in commercial operations. While it is known that oxygen promotes resin formation in furfural, oxygen-containing gases are excluded from substantially all commercial units. Antioxidants, therefore, exert no protective function against resin formation which proceeds rapidly at elevated temperatures in systems wherein oxygen is excluded. In fact, conventional antioxidants such as phenols and amino compounds are known to react with furfural at elevated temperatures, to form non-volatile products, thus accounting for appreciable solvent loss as well as accumulation of large quantities of solid materials. We have found that quinoline and its alkyl homologs are effective in retarding the formation of heavy polymers, tars, resins and the like in furfural. The preferred inhibitors of the present invention are quinoline and its mono-methyl derivatives, especially 2-methyl quinoline (quinaldine) although other alkyl-substituted quinolines such as the di- and tri-methyl, ethyl and propyl substitution products and the like are not excluded from the scope of this disclosure.

Examples of inhibitors which may be used in accordance with the present invention are the following:

| Compound | B. P., °C. |
|---|---|
| Quinoline | 237. |
| 2-Methyl Quinoline (Quinaldine) | 245. |
| 3-Methyl Quinoline | 250 at 710 mm. |
| 4-Methyl Quinoline | 261-3. |
| 6-Methyl Quinoline | 258-9. |
| 7-Methyl Quinoline | 258. |
| 8-Methyl Quinoline | 248. |
| 2,3-Dimethyl Quinoline | 261 at 729 mm. |
| 2,4-Dimethyl Quinoline | 264-5. |
| 2,6-Dimethyl Quinoline | 266-7. |
| 3,4-Dimethyl Quinoline | 290 at 737 mm. |
| 5,8-Dimethyl Quinoline | 265 at 736 mm. |
| 6,8-Dimethyl Quinoline | 268-9. |

Instead of a single compound, we may use mixtures of any two or more of the foregoing compounds. Or we may use commercial concentrates whether prepared synthetically or derived from coal tar or other suitable source by known methods or methods discovered in the future. We need not use the pure compound or mixture although we generally prefer to use material of commercial purity. The inhibitor may contain materials other than quinoline or alkyl quinolines, which exert an inhibiting action such as pyridine or alkyl pyridines or alkali metal thiocyanate. It should be free from materials which are harmful such as piperidine, isoquinoline or the like.

The mode of addition of the inhibitor to the furfural may be by any suitable means. Generally it will be most convenient to add it to the circulating solvent stream but any other method suitable to the system at hand may be employed.

The quantity of inhibitor required depends upon the rate of polymerization of the solvent in the system under consideration. Among the factors affecting the rate of polymerization may be mentioned the temperature, the time during which a given sample of furfural is subjected to elevated temperatures, the presence of certain heavy metals such as iron, copper, tin and lead and their salts, and the presence of other substances such as water, oxygen, tars, gums and the like. The polymer itself has been shown to exert an accelerating effect on the rate of polymerization. Free mineral acids, particularly hydrochloric acid, even when present in minute quantities, also have a pronounced accelerating effect on the polymerization rate. Among the metal salts which may be present in the furfural stream, iron salts, particularly ferric chloride, are especially active in promoting the formation of resinous materials. Since variations in these factors will be found in different systems employing furfural, it is obvious that the individual cases must be studied in order to determine the amount of inhibitor necessary to effect the desired results. The optimum quantity of inhibitor is best determined experimentally by making tests on small samples withdrawn from the system. In general, the amount of inhibitor may vary from about 0.01 to about 0.5 weight per cent of the furfural although in special cases quantities as high as 1.0 per cent may be used.

The concentration of inhibitor maintained throughout the stream is an important factor in the satisfactory operation of the present invention and may be controlled by either continuous or intermittent addition of a small quantity of fresh inhibitor. Certain minor losses such as those resulting from reaction with various materials in the stream account for a gradual reduction in inhibitor concentration. The problem of mechanical losses incurred is of little consequence when the inhibitors of the present invention are employed. The boiling points of these preferred compounds are substantially higher than the boiling point of furfural but in rerunning operations for the removal of heavy polymer, when steam distillation is used, said compounds are volatile along with the furfural and very little, if any, loss results through removal with the nonvolatile residue. On the other hand, when lower boiling substances such as pyridine and its alkyl homologs are used, considerable quantities may be distilled and discarded with the aqueous layer whereas the less volatile quinoline bases will not be carried over in the light ends and thereby separated from the solvent. The problem of recovery of inhibitor from the more volatile fractions is therefore eliminated.

The amount of inhibitor should not be allowed to build up in the stream above the range which has been determined as suitable in any given case and ordinarily amounts of 0.5 to 1.0 per cent and above are to be avoided since increasingly large amounts of these compounds appear to promote rather than retard the rate of polymer formation. At elevated temperatures it is possible that the inhibitor reacts with the furfural although no evidence of such activity is observed when the concentration is maintained within the preferred limits of our invention.

According to the present process the addition of quinoline and its alkyl homologs will generally effect a reduction in the polymerization rate of furfural from 25 to 80 or 90 per cent and in some cases substantially complete reduction is accomplished. The small quantities of polymer which gradually accumulate are then removed by any suitable means such as continuous redistillation. Through the use of our inhibitors the replacement costs of the solvent are kept at a minimum and the operating expense attendant in the redistillation process becomes of minor importance.

It is noteworthy that while the present invention involves the discovery that quinoline is a very effective inhibitor for furfural polymerization, laboratory tests have shown that isoquinoline which is isomeric therewith and has about the same boiling point is a promoter of polymerization and must be rigidly excluded from the system.

The following examples are offered as further illustration of the nature of this invention; however, no limitations are to be implied except as hereinafter imposed by the claims.

*Example I*

The effect of quinoline as a furfural polymerization inhibitor was determined by carrying out a series of tests on a sample of distilled furfural containing 0.0036 per cent by weight of hydrogen chloride and approximately 5 per cent by weight of water. Parallel tests were made on an uninhibited sample and on samples containing 0.02 weight per cent and 0.10 weight per cent of quinoline, respectively. Portions of the uninhibited furfural and of mixtures of the furfural and quinoline were placed in glass tubes, the air was replaced by nitrogen and the tubes sealed and immersed in an oil bath where the temperature was maintained at 260° F. At intervals tubes were removed, cooled to 32° F., opened and the nonvolatile polymer determined by a rapid vacuum distillation method carried out under carefully controlled conditions. The method comprises the rapid distillation of substantially all the furfural at temperatures not to exceed 212° F., the removal of traces of volatile matter by suitable means and weighing of the residue. The rate of polymer formation was established in each case by comparison of the tarry, non-volatile residue formed with that present in the sample at the beginning of the test. The tabulation which follows shows the polymer formed in the quinoline-inhibited samples as contrasted with the polymerization rate under the same conditions in the absence of an inhibitor.

|  | Hours at 260° F. | | |
|---|---|---|---|
|  | 24 | 48 | 68 |
| Polymer Formed, wt. per cent: | | | |
| Uninhibited Sample | 1.06 | 1.49 | 1.79 |
| Quinoline, 0.02 wt. per cent | 0.26 | 0.40 | 0.68 |
| Quinoline, 0.10 wt. per cent | 0.19 | 0.27 | 0.30 |
| Polymer Formation, wt. per cent per day: | | | |
| Uninhibited Sample | 1.06 | 0.75 | 0.63 |
| Quinoline, 0.02 wt. per cent | 0.26 | 0.20 | 0.24 |
| Quinoline, 0.10 wt. per cent | 0.19 | 0.135 | 0.105 |
| Reduction in Polymerization Rate, per cent: | | | |
| Quinoline, 0.02 wt. per cent | 75 | 73 | 62 |
| Quinoline, 0.10 wt. per cent | 82 | 82 | 83 |

The graphs portrayed in the accompanying drawing represent plots of polymer formed vs. hours at 260° F. as set forth in the above tabulation.

*Example II*

A sample of used furfural obtained from the circulating stream in a commercial extractive distillation unit employing this solvent for the separation of butanes, butenes and butadiene contained 5.4 per cent water and 0.88 per cent polymer. To 100 parts by weight of this furfural 0.10 part of quinoline was added and the polymerization rate determined as in Example I. Over a 24-hour period at 260° F. the uninhibited sample showed non-volatile polymer forming at the rate of 0.27 per cent per day while the inhibited sample polymerized at the rate of only 0.15 per cent per day. Thus the reduction effected by the use of quinoline was 44 per cent.

*Example III*

A sample of used furfural obtained from the circulating stream in a commercial extractive distillation unit employing this solvent for separation of butane, butenes and butadiene contained 5.2 per cent water and 0.47 per cent polymer. To 100 parts by weight of this furfural, 0.10 part of 2-methyl quinoline (quinaldine) was added and the polymerization rate determined as in Example I. Over a 48 hour period at 260° F., the uninhibited sample showed non-volatile polymer forming at the rate of 0.21 per cent per day, while the inhibited sample polymerized at the rate of only 0.12 per cent per day. Thus the reduction effected by the use of quinaldine was 42 per cent.

We claim:
1. A method of inhibiting the polymerization of furfural which comprises incorporating therein a minor proportion of a compound selected from the group consisting of quinoline and its alkyl homologs.
2. A method of inhibiting the polymerization of furfural which comprises incorporating therein a minor proportion of quinoline.
3. A method of inhibiting the polymerization of furfural which comprises incorporating therein a minor proportion of a methyl quinoline.
4. A method of inhibiting the polymerization of furfural which comprises incorporating therein a minor proportion of 2-methyl quinoline.
5. A method of inhibiting the polymerization of furfural which comprises incorporating therein from 0.01 to 0.50 per cent of a compound selected from the group consisting of quinoline and its alkyl homologs.
6. A method of inhibiting the polymerization of furfural which comprises incorporating therein from 0.01 to 0.50 per cent of quinoline.
7. A method of inhibiting the polymerization of furfural which comprises incorporating therein from 0.01 to 0.50 per cent of a methyl quinoline.
8. A method of inhibiting the polymerization of furfural which comprises incorporating therein from 0.01 to 0.50 per cent of 2-methyl quinoline.
9. An improved selective solvent comprising furfural in intimate admixture with from 0.01 to 0.50 per cent of a compound selected from the group consisting of quinoline and its alkyl homologs.
10. An improved selective solvent comprising furfural in intimate admixture with from 0.01 to 0.50 per cent of quinoline.
11. An improved selective solvent comprising furfural in intimate admixture with from 0.01 to 0.50 per cent of 2-methyl quinoline.
12. An improved selective solvent consisting essentially of furfural containing dissolved water in amount ranging from 1% up to saturation and from 0.01 to 0.50 per cent of a compound selected from the group consisting of quinoline and its alkyl homologs as a polymerization inhibitor for the furfural.
13. An improved selective solvent consisting essentially of furfural containing dissolved water in amount ranging from 1% up to saturation and from 0.01 to 0.50 per cent of quinoline as a polymerization inhibitor for the furfural.
14. An improved selective solvent consisting essentially of furfural containing dissolved water in amount ranging from 1% up to saturation and from 0.01 to 0.50 per cent of 2-methyl quinoline as a polymerization inhibitor for the furfural.

JOHN C. HILLYER.
DANIEL A. NICEWANDER.

REFERENCES CITED

The following references are of record in the file of this patent:

UNITED STATES PATENTS

| Number | Name | Date |
|---|---|---|
| 2,166,125 | Britton et al. | July 18, 1939 |
| 2,240,764 | Dreisbach et al. | May 6, 1941 |
| 2,293,724 | Faerber | Aug. 25, 1942 |
| 2,382,207 | Comstock | Aug. 14, 1945 |
| 2,384,238 | Comstock | Sept. 4, 1945 |